United States Patent Office 2,723,267
Patented Nov. 8, 1955

2,723,267

CYANINE DYES

Douglas James Fry and Bernard Alan Lea, Ilford, England, assignors to Ilford Limited, Ilford, England, a British company No Drawing. Application October 7, 1954,
Serial No. 461,043

9 Claims. (Cl. 260—240.6)

This invention relates to cyanine dyes which are of value as sensitisers for photographic silver halide emulsions.

According to the present invention there is provided a new class of cyanine dye bases of the general Formula I:

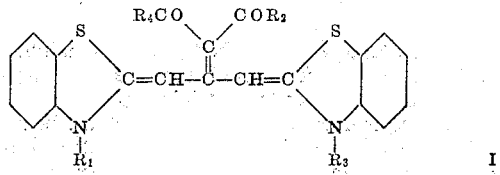

where $R_1$, $R_2$ and $R_3$ are alkyl groups and $R_4$ is selected from the class consisting of alkyl and alkoxy groups, $R_2$ and $R_4$ together containing less than 12 carbon atoms, and wherein the benzene rings may contain one or two halogen, alkyl, alkoxy or aryl groups. The said dyestuffs, and particularly those in which $R_1$, $R_2$ and $R_3$ are lower alkyl groups containing up to 4 carbon atoms, and $R_4$ is methyl, ethyl and methoxy groups, are valuable sensitisers for photographic silver halide emulsions, imparting to silver iodobromide emulsions, for example, a strong sensitivity in the green and red regions of the spectrum. The present invention includes photographic silver halide emulsions containing the aforesaid dyestuffs in sensitising amount.

According to a further feature of the present invention, the said cyanine dyes are prepared by reacting a cyanine dye salt of the Formula II:

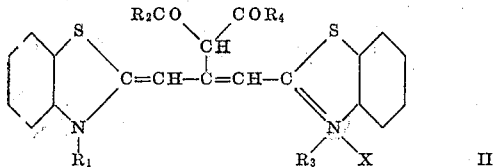

where X is an acid residue and the other symbols have the meanings assigned to them above and wherein the benzene rings may be substituted as indicated above, with a strong base.

Compounds of general Formula II may be prepared by the method described in co-pending application Serial No. 335,996, now Patent No. 2,712,013, i. e., by reacting a compound of the general Formula III:

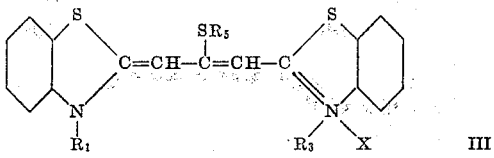

where $R_5$ is an alkyl, aralkyl or aryl group, the other symbols have the meanings assigned to them above and the benzene rings may be substituted as indicated above, with a β-dicarbonyl compound of the formula

$R_2COCH_2COR_4$ where $R_2$ and $R_4$ have the meanings assigned to them above.

Referring to the symbols used in the foregoing formulae, it is to be understood that where alkyl groups are referred to these may be, for example, methyl, ethyl, propyl, butyl or a higher alkyl group, and where aryl groups are referred to these may be, for example, phenyl or naphthyl. Alkoxy groups may be derived from any of the foregoing alkyl groups. Halogen substituents on the benzene rings may be, for example, chlorine or bromine atoms.

It is an essential characteristic of the present invention that the reaction shall be carried out with the aid of a strong base. It is preferred to use a strong inorganic base such as an alkali metal hydroxide, e. g. sodium or potassium hydroxide, but strong quaternary ammonium bases may also be employed, e. g. trimethyl benzyl ammonium hydroxide. Alkali metal alkoxides may also be employed and similar strong bases such as sodamide. Strong organic bases may also be employed, but are generally less efficient. Preferably the reaction is effected in a medium of pyridine.

The following examples will serve to illustrate the invention, but are not to be regarded as limiting it in any way:

EXAMPLE 1

*Preparation of 2:3'-diethyl-9-(acetylcarbethoxymethyl)-thiacarbocyanine*

0.64 gm. 3:3-diethyl-9-(acetylcarbethoxymethyl) thiacarbocyanine iodide was mixed with 5 mls. of pyridine and 1 ml. of 40% w./v. aqueous sodium hydroxide. The mixture was heated on a steam bath with frequent shaking for 30–40 minutes and then poured into 100 ml. of dry ether to precipitate the dye. The dye was filtered off and washed with more ether and water.

The crude dye was crystallised from 50 mls. acetone to give purple crystals with M. Pt. 204–206° C. (d).
Analysis.—S. Req. 13.01%, found 12.93%.

This dye when incorporated in a silver iodobromide emulsion extends the sensitivity to 6400 Å. with maxima at 5400 Å., 5800 Å. and 6100 Å.

EXAMPLE 2

*Preparation of 3:3'-dimethyl-9-(diacetylmethyl) thiacarbocyanine*

Method (a).—0.48 gm. 3:3'-dimethyl-9-(diacetylmethyl) thiacarbocyanine bromide, 10 mls. ethanol and 0.6 ml. of a 40% w./v. solution of benzyltrimethyl ammonium hydroxide were mixed and heated under reflux for ½ hour. The alcohol was then removed under reduced pressure and the residue stirred with ether and filtered. After washing with water and drying, the crude dye was purified by solution in 25 mls. ethanol, evaporating to 10 mls. and leaving to cool and crystallise. The dye separated as purple crystals with a bronze reflex, M. Pt. 228° C. (d).
Analysis.—N Req. 6.45%, found 6.14%; S Req. 14.55%, found 13.97%.

This dye, when incorporated in a silver iodobromide emulsion, extends the sensitivity to 6450 Å. with maxima at 5700 Å. and 6250 Å.

Method (b).—0.25 gm. 3:3'-dimethyl-9-(diacetylmethyl) thiacarbocyanine bromide and 0.02 gm. of sodium in 3 mls. of ethanol were mixed and heated under reflux for ½ hour. The alcohol was removed under reduced pressure and the residue stirred with ether, filtered and washed with water.
The dye obtained had M. Pt. 228° C. (d).
Method (c).—0.40 gm. 3:3'-dimethyl-9-(diacetylmethyl) thiacarbocyanine bromide, 5 mls. ethanol and 0.48 ml. 10% aqueous sodium hydroxide solution were mixed and heated under reflux for ½ hour. The alcohol was then evaporated under reduced pressure and the residue stirred with ether and filtered. The dye after washing with water had M. Pt. 222° C. (d).

*Method (d)*.—0.48 gm. 3:3'- dimethyl - 9 - (diacetylmethyl) thiacarbocyanine bromide and 5 mls. pyridine were mixed and heated on the water bath until most of the dye was in solution, when a solution of 0.035 gm. of sodium hydroxide in 0.8 ml. water was added. After heating for 10 minutes the mixture was cooled, diluted with 60 ml. of ether and water. The crude dye was recrystallised from ethyl alcohol. M. Pt. 230–231° C. (d).

EXAMPLE 3

*Preparation of 3:3'-diethyl-9-(acetylcarbomethoxymethyl) thiacarbocyanine*

0.49 gm. 3:3'-diethyl-9-(acetylcarbomethoxymethyl) thiacarbocyanine iodide was mixed with 5 mls. of pyridine and a solution of 0.04 gm. sodium hydroxide on 0.5 ml. water, and the mixture heated on a steam bath for 8 minutes. It was then cooled, diluted with ether (100 mls.), filtered and the residue washed with water. The crude dye was taken up in 40 mls. of ethanol from which starting material separated after concentration to 10 mls. This was filtered off and from the filtrate the product was precipitated as purple needles (M. Pt. 241–243° C. (d)) by the addition of dry ether.

*Analysis.*—N. Req. 5.84%, found 5.78%.

When incorporated in a silver iodobromide emulsion the sensitivity was extended to 6350 Å. with a broad maximum at about 6000 Å.

EXAMPLE 4

*Preparation of 3:3'-diethyl-9-diacetylmethyl thiacarbocyanine*

1.0 gm. 3:3'-diethyl-9-diacetylmethyl thiacarbocyanine iodide was mixed with 5 mls. of pyridine and a solution of 0.08 gm. sodium hydroxide in 0.8 ml. water. The mixture was heated for 12 minutes on the steam bath and then cooled, diluted with 130 mls. of ether and filtered. After washing with water and drying the crude dye was twice purified by solution in ethanol followed by fractional precipitation with ether. The first fraction in each case contained traces of starting material. The purified product separated as green needles, M. Pt. 226° C.

*Analysis.*—N. Req. 6.05%, found 5.90%.

This dye, when incorporated in a silver iodobromide emulsion, extends the sensitivity to 6400 Å. with a maximum at 6200 Å.

EXAMPLE 5

*Preparation of 3:3'-dimethyl-5-chloro-9-diacetylmethyl thiacarbocyanine*

0.67 gm. of 3:3'-dimethyl-5-chloro-9-diacetylmethyl thiacarbocyanine iodide was mixed with 5 mls. of pyridine and 1.12 mls. of 50% w./v. aqueous potassium hydroxide and heated with frequent shaking on a steam bath for 20 minutes. The mixture was then diluted with 100 mls. of ether, filtered and washed with water. The crude dye was purified by fraction precipitation from ethanol by the addition of ether and separated as purple crystals.

This dye, when incorporated in a silver iodobromide emulsion, extends the sensitivity to 6500 Å. with a maximum at 6150 Å.

EXAMPLE 6

*Preparation of 3:3'-diethyl-5:5'-dimethyl-9-(diacetylmethyl) thiacarbocyanine*

0.90 gm. 3:3'-diethyl-5:5'-dimethyl-9-(diacetylmethyl) thiacarbocyanine iodide was mixed with 5 mls. of pyridine and 0.56 ml. 50% w./v. aqueous potassium hydroxide and then heated on the steam bath for ¾ hour. The mixture was then cooled, diluted with ether, filtered and the residue washed with water. The crude dye was dissolved in 10 mls. of ethanol, from which a little starting material crystallised on cooling. After this was filtered off, dry ether was added to the filtrate to precipitate the product as dark green crystals, M. Pt. 212–213° C. (d).

This dye, when incorporated in a silver iodobromide emulsion, extends the sensitivity to 6250Å. with a maximum at 5900 Å.

What we claim is:

1. A cyanine dye base selected from the class consisting of dye bases of the general formula:

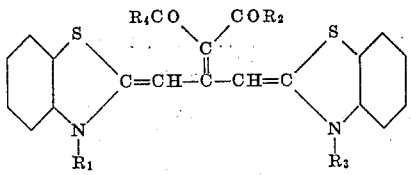

where $R_1$, $R_2$ and $R_3$ are alkyl groups containing up to 4 carbon atoms, $R_4$ is selected from the class consisting of alkyl and alkoxy groups containing up to 4 carbon atoms, and corresponding compounds in which the benzene rings carry from one to two substituents selected from the group consisting of alkyl and alkoxy groups containing up to 4 carbon atoms, phenyl, chlorine and bromine substituents.

2. The compound 3:3'-diethyl-9-(acetylcarbethoxymethyl) thiacarbocyanine of the formula:

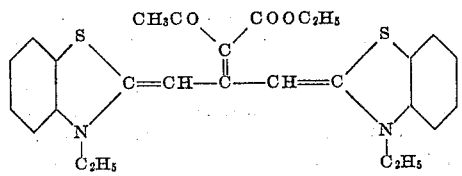

3. The compound 3:3'-dimethyl-9-(diacetylmethyl) thiacarbocyanine of the formula:

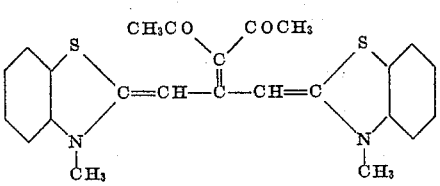

4. The compound 3:3'-diethyl-9-(acetylcarbomethoxymethyl) thiacarbocyanine of the formula:

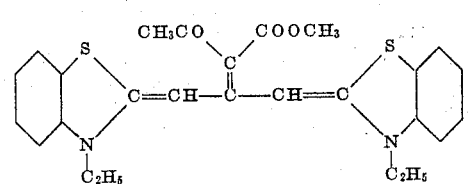

5. The compound 3:3'-diethyl-9-diacetylmethyl thiacarbocyanine of the formula:

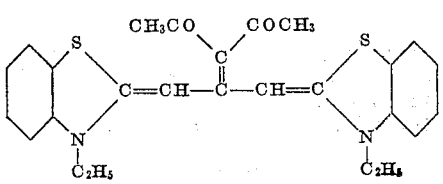

6. The compound 3:3′-dimethyl-5-chloro-9-diacetyl-methyl thiacarbocyanine of the formula:

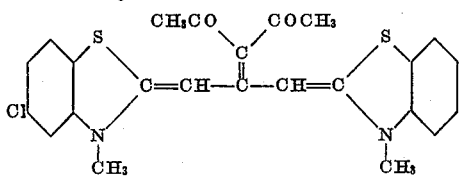

7. A process for the production of a cyanine dye base selected from the class consisting of dye bases of the general formula:

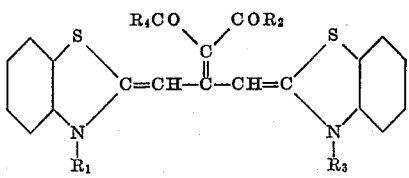

where $R_1$, $R_2$ and $R_3$ are alkyl groups containing up to 4 carbon atoms, $R_4$ is selected from the class consisting of alkyl and alkoxy groups containing up to 4 carbon atoms, and corresponding compounds in which the benzene rings carry from one to two substituents selected from the group consisting of alkyl and alkoxy groups containing up to 4 crabon atoms, phenyl, chlorine and bromine substituents, which process comprises reacting a compound of the general formula:

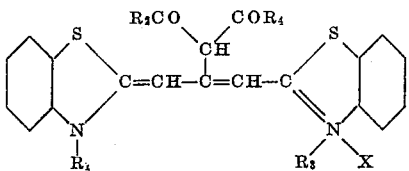

with a strong base.

8. A process for the production of a cyanine dye base selected from the class consisting of dye bases of the general formula:

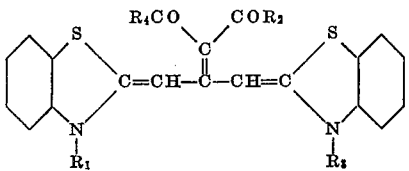

where $R_1$, $R_2$ and $R_3$ are alkyl groups containing up to 4 carbon atoms, $R_4$ is selected from the class consisting of alkyl and alkoxy groups containing up to 4 carbon atoms, and corresponding compounds in which the benzene rings carry from one to two substituents selected from the group consisting of alkyl and alkoxy groups containing up to 4 carbon atoms, phenyl, chlorine and bromine substituents, which process comprises reacting a compound of the general formula:

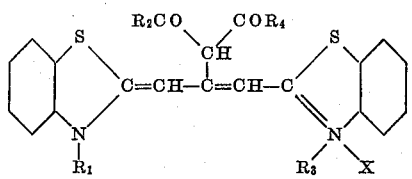

with an alkali metal hydroxide.

9. A process for the production of a cyanine dye base selected from the class consisting of dye bases of the general formula:

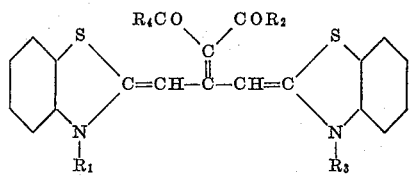

where $R_1$, $R_2$ and $R_3$ are alkyl groups containing up to 4 carbon atoms, $R_4$ is selected from the class consisting of alkyl and alkoxy groups containing up to 4 carbon atoms, and corresponding compounds in which the benzene rings carry from one to two substituents selected from the group consisting of alkyl and alkoxy groups containing up to 4 carbon atoms, phenyl, chlorine and bromine substituents, which process comprises reacting a compound of the general formula:

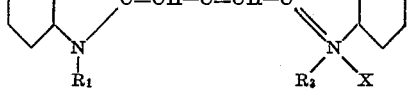

with an alkali metal hydroxide in a medium of pyridine.

No references cited.